United States Patent
Thiel et al.

(10) Patent No.: US 12,128,480 B2
(45) Date of Patent: Oct. 29, 2024

(54) APPARATUS AND METHOD FOR PRODUCING A THREE-DIMENSIONAL WORK PIECE

(71) Applicant: Nikon SLM Solutions AG, Luebeck (DE)

(72) Inventors: Christiane Thiel, Luebeck (DE); Daniel Brueck, Luebeck (DE)

(73) Assignee: NIKON SLM Solutions AG, Luebeck (DE)

(*) Notice: Subject to any disclaimer, the term of this patent is extended or adjusted under 35 U.S.C. 154(b) by 68 days.

(21) Appl. No.: 17/617,345

(22) PCT Filed: Jun. 10, 2020

(86) PCT No.: PCT/EP2020/066099
§ 371 (c)(1),
(2) Date: Dec. 8, 2021

(87) PCT Pub. No.: WO2020/249619
PCT Pub. Date: Dec. 17, 2020

(65) Prior Publication Data
US 2022/0355380 A1    Nov. 10, 2022

(30) Foreign Application Priority Data
Jun. 13, 2019 (DE) .................... 10 2019 116 109.6

(51) Int. Cl.
*B22F 10/366* (2021.01)
*B22F 10/28* (2021.01)
(Continued)

(52) U.S. Cl.
CPC ............ *B22F 10/366* (2021.01); *B22F 10/28* (2021.01); *B22F 10/36* (2021.01); *B22F 10/38* (2021.01);
(Continued)

(58) Field of Classification Search
CPC ........ B29C 64/153; B29C 64/264–282; B29C 64/393; B22F 10/28; B22F 10/36;
(Continued)

(56) References Cited

U.S. PATENT DOCUMENTS 5,753,171 A    5/1998  Serbin et al.
2003/0059334 A1  3/2003  Shen et al.
(Continued)

FOREIGN PATENT DOCUMENTS

CN    107530962    1/2018
CN    107980023    5/2018
(Continued)

OTHER PUBLICATIONS

Roehling et al., Modulating laser intensity profile ellipticity for microstructural control during metal additive manufacturing (2017), Acta Materialia, 197-206 (Year: 2017).*
(Continued)

*Primary Examiner* — Susan D Leong
*Assistant Examiner* — Jennifer L Groux
(74) *Attorney, Agent, or Firm* — Williams Mullen; Thomas F. Bergert (57) ABSTRACT

An apparatus for producing a three-dimensional work piece is provided. The apparatus comprises an irradiation unit comprising at least one scanning unit configured to scan a radiation beam over an uppermost layer of raw material powder to predetermined sites of the uppermost layer of the raw material powder in order to solidify the raw material powder at the predetermined sites. An axis corresponding to the radiation beam when it impinges on the uppermost layer of raw material powder at an angle of 90° is defined as a central axis for the scanning unit. The apparatus further comprises a control unit configured to receive work piece data indicative of at least one layer of the three-dimensional
(Continued)

work piece to be produced, and assign at least a part of a contour of the layer of the three-dimensional work piece to the at least one scanning unit. According to a first aspect, the control unit is configured to generate control data for controlling the irradiation unit, the control data defining a scan strategy of the radiation beam such that for more than 50% of a predefined length, the radiation beam moves away from the central axis, the predefined length being defined as a length the radiation beam moves along the contour assigned to the at least one scanning unit, excluding sections concentric with regard to the central axis. Further, corresponding methods and computer program products are provided.

8 Claims, 6 Drawing Sheets (51) Int. Cl.
| | |
|---|---|
| B22F 10/36 | (2021.01) |
| B22F 10/38 | (2021.01) |
| B22F 10/85 | (2021.01) |
| B22F 12/44 | (2021.01) |
| B22F 12/45 | (2021.01) |
| B22F 12/49 | (2021.01) |
| B22F 12/90 | (2021.01) |
| B28B 1/00 | (2006.01) |
| B33Y 10/00 | (2015.01) |
| B33Y 30/00 | (2015.01) |
| B33Y 50/02 | (2015.01) |
| B22F 12/41 | (2021.01) |

(52) U.S. Cl.
CPC .............. *B22F 10/85* (2021.01); *B22F 12/45* (2021.01); *B22F 12/49* (2021.01); *B22F 12/90* (2021.01); *B28B 1/001* (2013.01); *B33Y 10/00* (2014.12); *B33Y 30/00* (2014.12); *B33Y 50/02* (2014.12); *B22F 12/41* (2021.01); *B22F 12/44* (2021.01)

(58) Field of Classification Search
CPC ........ B22F 10/366; B22F 10/38; B22F 10/85; B22F 12/40–49; B33Y 50/02
See application file for complete search history.

(56) References Cited

U.S. PATENT DOCUMENTS

| | | | |
|---|---|---|---|
| 2014/0332507 A1 | 11/2014 | Fockele | |
| 2015/0151491 A1 | 6/2015 | Teulet | |
| 2015/0174827 A1* | 6/2015 | Schwarze | B29C 64/393 700/120 |
| 2016/0045989 A1 | 2/2016 | Bruck et al. | |
| 2016/0114432 A1* | 4/2016 | Ferrar | B23K 26/342 219/76.12 |
| 2017/0136696 A1* | 5/2017 | Jakimov | B29C 64/371 |
| 2017/0144371 A1 | 5/2017 | Lussier et al. | |
| 2021/0387261 A1* | 12/2021 | Takeshita | B22F 10/37 |

FOREIGN PATENT DOCUMENTS

| | | |
|---|---|---|
| CN | 109177153 | 1/2019 |
| CN | 109311227 | 2/2019 |
| DE | 102017202843 | 7/2018 |
| DE | 102017219184 | 5/2019 |
| EP | 2862651 | 4/2015 |
| EP | 2878402 | 6/2015 |
| EP | 2961549 | 1/2016 |
| JP | 2004284025 | 10/2004 |
| JP | 2015199195 | 11/2015 |
| JP | 2016527101 | 9/2016 |
| JP | 2017149132 | 8/2017 |
| JP | 2017527699 | 9/2017 |
| JP | 2018126985 | 8/2018 |
| JP | 2018127710 | 8/2018 |
| WO | 2014199134 | 12/2014 |
| WO | 2015133138 | 9/2015 |

OTHER PUBLICATIONS

Fiegl et al., Impact of build envelope on the properties of additive manufactured parts from AlSi10Mg (2018), Optics and Laser Technology, 51-57 (Year: 2019).*
Khairallah et al., Laser powder-bed fusion additive manufacturing: Physics of complex melt flow and formation mechanisms of pores, spatter, and denudation zones (2016), Acta Materialia, 36-45 (Year: 2016).*
Jean-Pierre Kruth et al: "On-line monitoring and process control in selective laser melting and laser cutting", Proceedings of the 5th Lane Conference, Laser Assisted Net Shape Engineering, vol. 1, Sep. 1, 2007, p. 23.
International Search Report and Written Opinion for PCT/EP2020/066099, European Patent Office, Jul. 21, 2020.
Japanese Patent Office, Japanese Examination Report for JP Patent Application No. 2021-573590, Jan. 13, 2023.
China National Intellectual Property Administration, Examination Report for International Patent Application No. CN 202080050825.8, Apr. 29, 2023.
Search Report for German Patent Application No. 10 2019 116 109.6, German Patent and Trademark Office, Feb. 26, 2020.

* cited by examiner

APPARATUS AND METHOD FOR PRODUCING A THREE-DIMENSIONAL WORK PIECE

CROSS-REFERENCE TO RELATED APPLICATIONS

This application is the U.S. national phase of international application PCT/EP2020/066099, filed on Jun. 10, 2020, which claims the benefit of German application DE 10 2019 116 109.6 filed on Jun. 13, 2019; all of which are hereby incorporated herein in their entirety by reference.

The present invention relates to an apparatus and a method for producing a three-dimensional work piece. In particular, the present invention is directed to an apparatus and a method for producing a three-dimensional work piece by solidifying multiple layers of raw material powder by means of a radiation beam.

Powder bed fusion is an additive layering process by which pulverulent, in particular metallic and/or ceramic raw materials can be processed to three-dimensional work pieces of complex shapes. To that end, a raw material powder layer is applied onto a carrier and subjected to radiation (e.g., laser or particle radiation) in a site-selective manner in dependence on the desired geometry of the work piece that is to be produced. The radiation penetrating into the powder layer causes heating and consequently melting or sintering of the raw material powder particles. Further raw material powder layers are then applied successively to the layer on the carrier that has already been subjected to radiation treatment, until the work piece has the desired shape and size. Powder bed fusion may be employed for the production of prototypes, tools, replacement parts, high value components or medical prostheses, such as, for example, dental or orthopedic prostheses, on the basis of CAD data. Examples for powder bed fusion techniques include selective laser melting and selective laser sintering.

Apparatuses are known for producing one or more work pieces according to the above technique. For example, EP 2 961 549 A1 and EP 2 878 402 A1, respectively, describe an apparatus for producing a three-dimensional work piece according to the technique of selective laser melting. The general principles described in these documents may also apply to the technique of the present disclosure.

In particular, in the course of growing demand for larger build chambers for producing larger work pieces, apparatuses are known that have more than one scanning unit for scanning a corresponding radiation beam, wherein each of the scanning units irradiates a predefined irradiation area on a surface of the raw material powder.

It is known that several factors and, in particular, parameters that can be set in an apparatus for producing a three-dimensional work piece in the above-described way, have an influence on the quality of the produced work piece. Such parameters may relate to physical properties of the radiation beam (such as power, focus size, wavelength, etc.) and/or physical properties of the raw material powder used (chemical composition, temperature, density, etc.). The quality of the work piece can be ex-pressed, e.g., by a density, a surface roughness, a three-dimensional accuracy with regard to the corresponding CAD data, etc.

Although several efforts have been made in the recent past for improving the quality of a generated work piece, the prior art techniques still have the problem that in some cases the quality of the work pieces needs to be improved, in particular with regard to a surface roughness of the work piece.

The invention is therefore directed at the object of providing an apparatus and a method, which solve the above-described problems and/or other related problems.

This object is addressed by an apparatus, by a method, and by a computer program product as described herein.

According to a first aspect, an apparatus for producing a three-dimensional work piece is provided. The apparatus comprises an irradiation unit comprising at least one scanning unit configured to scan a radiation beam over an uppermost layer of raw material powder to predetermined sites of the uppermost layer of the raw material powder in order to solidify the raw material powder at the predetermined sites. An axis corresponding to the radiation beam when it impinges on the uppermost layer of raw material powder at an angle of 90° is defined as a central axis for the scanning unit. The apparatus further comprises a control unit configured to receive work piece data indicative of at least one layer of the three-dimensional work piece to be produced, and assign at least a part of a contour of the layer of the three-dimensional work piece to the at least one scanning unit. The control unit is configured to generate control data for controlling the irradiation unit, the control data defining a scan strategy of the radiation beam such that for more than 50% of a predefined length, the radiation beam moves away from the central axis, the predefined length being defined as a length the radiation beam moves along the contour assigned to the at least one scanning unit, excluding sections concentric with regard to the central axis.

The radiation beam may be a laser beam, an electron beam, or another kind of energy beam suitable for solidifying the raw material powder. In particular, the radiation beam may be a laser beam in the infrared wavelength region. The solidification of the raw material powder may be performed by means of melting (e.g., selective laser melting) or by means of sintering (e.g., selective laser sintering). In the following disclosure, the invention will be described with reference to the well-known technique of selective laser melting. However, the present disclosure shall not be understood to be limiting in this regard and can also be applied, e.g., to other types of powder bed fusion techniques.

The apparatus may comprise a carrier for receiving multiple layers of raw material powder. The carrier may be movable in a vertical direction (up and down), such that after a first layer of the work piece to be built is completely irradiated, the carrier can be lowered and a second layer of raw material powder is applied onto the first layer and the second layer of the work piece can be irradiated and solidified. This process is continued until the work piece is finished. The carrier may comprise a substantially flat surface which defines a horizontal plane (in an x-y-plane of a Cartesian coordinate system). As described above, the carrier may be movable along the z-direction perpendicular to the x-y-plane.

The Irradiation unit may comprise a laser source. However, the laser source may also be arranged outside the irradiation unit and guided to the irradiation unit by means of an optical fiber and/or one or more mirrors. The irradiation unit may further comprise a focus unit configured to change a focus position of the radiation along a direction of the beam path (e.g., substantially along the z-direction). The irradiation unit may further comprise one or more optical components such as a beam expander, a collimator, and an f-theta lens, etc.

At the point where the central axis intersects the uppermost layer of raw material powder, a center point is defined for the scanning unit. The central axis is defined by means of the radiation beam when it impinges on the uppermost layer of raw material powder at an angle of 90°, such that it forms a surface normal with regard to a surface defined by the uppermost layer of raw material powder. In other words, the center point may be defined as a point of the layer of raw material powder, which has the shortest distance to the scanning unit and/or to a lens of the irradiation unit through which the radiation beam is emitted (e.g., an f-theta lens).

The control unit may be a general control unit of the apparatus. The work piece data may be CAD-data defining a three-dimensional structure of the work piece to be produced. The work piece data may, e.g., be a data set defining individual (two-dimensional) layers of the work piece or it may be a data set defining a three-dimensional structure, wherein the control unit is configured to analyze and process the work piece data so as to generate data for each individual layer. In other words, the work piece data may either originally be or may be processed to represent data defining individual layers of the work piece to be produced. Each layer of the work piece data may define a contour of the work piece, which corresponds to a (one-dimensional) section of a surface of the work piece. Within the contour(s), the work piece data may define an inner part of the work piece. At least a part of the contour is assigned to the scanning unit. For example, in case only one scanning unit is provided, the entire contour may be assigned to the one scanning unit. However, in case more than one scanning units are provided, a first part of the contour (i.e., a first section of the contour) may be assigned to a first scanning unit and a second part of the contour may be assigned to a second scanning unit.

The control data may be regarded as data necessary for instructing the individual units of the apparatus (and, in particular, the one or more scanning units of the irradiation unit), to perform the necessary actions in order to produce the desired work piece. The scan strategy may define one or more beam paths of the radiation beam. In other words, the scan strategy may define a course of irradiation locations and, more precisely, it may define at which time and/or in which order a particular location of the raw material powder is irradiated and solidified. During the production of the work piece, the control unit of the apparatus may read the control data and produce a work piece according to the control data. The control data may define the work piece layer by layer since the production of the work piece also takes place layer by layer. More precisely, the work piece may be produced such that, firstly, a first layer of raw material powder is applied to a carrier and solidified by the radiation beam. After the solidification of the first layer of raw material powder at the desired locations is completed, a further layer of raw material powder is applied on top of the previous layer and the process of solidification starts again at the locations defined by the control data for the further layer. In this way, the work piece is built layer by layer.

The control data is defined such that for more than 50% of a predefined length, the radiation beam moves away from the central axis. The predefined length is defined as a length the radiation beam moves along the contour assigned to the at least one scanning unit, excluding sections concentric with regard to the central axis. In case the entire contour is assigned to one scanning unit, the above definition applies to a length of the entire contour, excluding the sections concentric with regard to the central axis. In case only a section of the contour is assigned to a particular scanning unit, the above definition applies to a length of said section of the contour, excluding the sections concentric with regard to the central axis. The definition that the radiation beam moves away from the central axis means that an angle formed between the central axis and the radiation beam increases during the irradiation defined by the control data. In other words, a distance between a center point (where the central axis intersects the uppermost layer of raw material) and a spot position of the radiation beam increases according to the definition of the control data. It should be further noted that the above definition may only apply to the times the radiation beam is actually used for solidifying the contour and not, e.g., for "jump" movements (that may be performed with reduced radiation power and/or with such a high speed that no melt pool is generated).

In line with the above definition, for more than 50% of the predefined length, the radiation beam is moved in a "piercing" direction. In the present disclosure, the movement, according to which the radiation beam moves away from the central axis, is called a "piercing" direction, because in case the radiation beam were a needle, it would pierce into the layer of raw material powder, if moved into this direction. The opposite direction, i.e., a movement, according to which the radiation beam moves towards the central axis, is called a "dragging" direction since the aforementioned needle would be dragged.

The above definition concerning the contour of the work piece to be produced may be also applied to an inner region of the work piece. In other words, also, e.g., a hatch pattern defining an inner region of the work piece, may be generated such that more than 50% of the hatch pattern is irradiated in a piercing direction. However, it may also be decided that the quality of the contour is more important than the quality of a hatch pattern in an inner region of the work piece. For example for that reason, it may be decided that the contour is irradiated as described above (more than 50% in a piercing direction) and that no corresponding limitations are applied to the inner region of the work piece.

In one or more embodiments, the apparatus comprises a plurality of scanning units. In this case, the control data may be defined such that the above definition holds for each of the scanning units. More precisely, a section of the contour assigned to a first scanning unit may be defined such that more than 50% of its length, excluding concentric sections, is solidified in a piercing direction. A section of the contour assigned to a second scanning unit may be defined such that more than 50% of its length, excluding concentric sections, is solidified in a piercing direction, etc.

The sections concentric with regard to the central axis are also referred herein as "concentric sections". These sections are sections of the contour that are purely concentric, i.e., have no radial component. The sections may therefore also be regarded as "circular" sections. For logical reasons, during the irradiation of these concentric sections, the laser beam cannot be moved away from the central axis or towards the central axis, since these sections have no radial component.

The predefined length may be defined as an entire length the radiation beam moves along the contour assigned to the at least one scanning unit. In other words, according to embodiments, the sections concentric with regard to the central axis may not be excluded from the determination of the "more than 50%" criterion. The definition of the "predefined length" may be replaced as mentioned above, since the definition not excluding the concentric sections is a narrower definition than the definition excluding the concentric sections. In other words, the definition not excluding the concentric sections is narrower than the definition excluding the concentric sections and encompasses the definition excluding the concentric sections. In the definition excluding the concentric sections, only a length of the contour is considered, where the laser beam has the possibility to move away from or towards the central axis. In the definition not excluding the concentric sections, the entire length of the assigned contour is considered.

The Irradiation unit of the apparatus of the first aspect may comprise a further scanning unit configured to scan a further radiation beam over the uppermost layer of raw material powder to predetermined sites of the uppermost layer of the raw material powder in order to solidify the raw material powder at the predetermined sites.

In this case, an axis corresponding to the further radiation beam when it impinges on the uppermost layer of raw material powder at an angle of 90° is defined as a further central axis for the further scanning unit. The control unit may be configured to assign a part of the contour of the layer of the three-dimensional work piece to the scanning unit, such that an angle between the radiation beam and the central axis stays below a predefined value smaller than a maximum possible deflection angle of the scanning unit, and to assign a further part of the contour to the further scanning unit, such that an angle between the further radiation beam and the further central axis stays below a further predefined value smaller than a maximum possible deflection angle of the further scanning unit.

According to a second aspect, an apparatus for producing a three-dimensional work piece is provided. The apparatus comprises an irradiation unit comprising at least one scanning unit configured to scan a radiation beam over an uppermost layer of raw material powder to predetermined sites of the uppermost layer of the raw material powder in order to solidify the raw material powder at the predetermined sites. An axis corresponding to the radiation beam when it impinges on the uppermost layer of raw material powder at an angle of 90° is defined as a central axis for the scanning unit. The apparatus further comprises a control unit configured to receive work piece data indicative of at least one layer of the three-dimensional work piece to be produced, and assign at least a part of a contour of the layer of the three-dimensional work piece to the at least one scanning unit. The irradiation unit of the apparatus of the second aspect comprises a further scanning unit configured to scan a further radiation beam over the uppermost layer of raw material powder to predetermined sites of the uppermost layer of the raw material powder in order to solidify the raw material powder at the predetermined sites. An axis corresponding to the further radiation beam when it impinges on the uppermost layer of raw material powder at an angle of 90° is defined as a further central axis for the further scanning unit. The control unit is configured to assign a part of the contour of the layer of the three-dimensional work piece to the scanning unit, such that an angle between the radiation beam and the central axis stays below a predefined value smaller than a maximum possible deflection angle of the scanning unit. The control unit is further configured to assign a further part of the contour to the further scanning unit, such that an angle between the further radiation beam and the further central axis stays below a further predefined value smaller than a maximum possible deflection angle of the further scanning unit.

The following optional details and further specifications may apply to the apparatus of the first aspect and/or to the apparatus of the second aspect.

According to the above definition and as used in the entire present disclosure, the expression "further" as used, e.g., in "further scanning unit" or "further radiation beam" is only used in order to provide a distinction with regard to the other previous-ly defined elements (e.g., "scanning unit" or "radiation beam"). Without any difference of the meaning of these expressions, they could also be replaced by "first scanning unit" and "second scanning unit", etc.

The maximum possible deflection angle of the respective scanning unit may be defined by physical properties of the scanning unit, i.e., by a maximum amount of tilt of a mirror of the scanning unit. In this way, the operation range of the respective scanning unit is intentionally limited to a region where the deflection angle is small and the radiation beam impinges on the raw material powder at angles close to 90°.

The control unit may be configured to generate control data for controlling the irradiation unit, the control data defining a scan strategy of the radiation beam such that an irradiation power of the radiation beam and/or a scan speed of the radiation beam is adapted based on an angle between the radiation beam and the central axis, such that the irradiation power is increased when the angle increases and/or the scan speed is decreased when the angle increases.

Since the energy density of the irradiation spot may decrease when the angle increases (due to a larger spot area of the layer of raw material powder), the aforementioned measures may help to maintain a constant or substantially constant amount of energy irradiated per unit area. In this case, the physical properties of the solidification process may be kept constant.

The control unit may be configured to, based on the work piece data, determine a thickness of the work piece in at least one region where the radiation beam is to be irradiated, decide whether the thickness is below a predefined threshold value, and, when the thickness is below the predefined threshold value, generate the control data for the at least one region such that the irradiation power is not increased in this region.

There may be regions of the work piece, in which the irradiation power is increased and regions having a low thickness (i.e., regions of the work piece having a low wall thickness), where the radiation power is not increased. This may help to protect the regions with low wall thickness from being destroyed by the increased irradiation power. In this case, e.g., in regions with a higher wall thickness, the above-described mechanism of increasing the irradiation power may be performed and in regions with a lower wall thickness, the above-described mechanism of increasing the irradiation power may not be performed. Alternatively or additionally, when the thickness is below the predefined threshold value, the control data may be generated for the at least one region such that the scan speed is not decreased in this region. The wall thickness may be defined as a wall thickness in the x-y-plane that corresponds to a layer of raw material powder. However, the wall thickness may also be defined as a thickness along the z-direction (vertical build direction). For example, it may be decided whether both a wall thickness in the x-y-plane and a wall thickness in the z-direction is below the predefined threshold value. Alternatively, it may be decided whether at least one of a wall thickness in the x-y-plane and a wall thickness in the z-direction is below the predefined threshold value. Based on the decision, the radiation power is increased and/or the scan speed is reduced in the respective region or not.

The control unit may be configured to generate the control data such that for more than 60%, for more than 70%, for more than 80%, or for more than 90% of the predefined length, the radiation beam moves away from the central axis.

More precisely, in each section of the present disclosure, where a lower limit of 50% is mentioned, this lower limit may be exchanged by 60%, 70%, 80%, or 90%. In other words, the fraction of the contour that is irradiated in a piercing direction may be increased. In some cases, this fraction may be even increased to 100%, such that the entire assigned contour of the work piece is irradiated in a piercing direction. In order to reduce a surface roughness of the produced work piece, it may be advantageous to increase said fraction. However, for reasons of efficiency and other technical/geometrical restrictions, it may not be possible to increase the fraction to 100%, such that the aforementioned lower limits of 50%, 60%, 70%, 80%, or 90% may represent good compromises. In line with the above discussion regarding the definition of the predefined length (excluding the concentric sections or not), the criterion of more than 50%, 60%, 70%, 80%, or 90%, may be applied to the predefined length excluding the concentric sections or to the entire length not excluding the concentric sections.

The predefined value (of the angle between the radiation beam and the central axis) and/or the further predefined value (of the angle between the further radiation beam and the further central axis) may be a value in a range between 10° to 25° and, in particular, in a range between 15° and 20°.

The predefined value can be set to a value in one of the aforementioned ranges, such as, e.g., 18°. When the predefined value (and/or the further predefined value) is in one of the aforementioned ranges, it can be guaranteed that the deflection angle (i.e., the angle between the central axis and the radiation beam) does not increase too much and, therefore, a good quality of the contour of the produced work piece can be guaranteed.

An overlap region may be defined between the scanning unit and the further scanning unit, wherein the overlap region can be irradiated by both the scanning unit and the further scanning unit when the angle between the respective radiation beam and the respective central axis is below the respective predefined value.

In this way, it can be guaranteed that the contour of the work piece can be continuously solidified with a low deflection angle and, therefore, with high quality (e.g., with regard to a surface roughness of the work piece).

The control unit may further be configured to assign a portion of the layer of the three-dimensional work piece that is not the contour to the scanning unit, such that said portion is irradiated, at least in part, by the radiation beam under an angle larger than the predefined value.

The portion of the layer of the work piece that is not the contour may be a section of an inner region of the work piece. The inner region of the work piece may be filled with a hatch pattern. For example it can be decided that particular quality requirements shall apply to the contour of the work piece (e.g., concerning the surface roughness) but different and/or lower quality standards are set with regard to an inner region of the work piece. For example in this case, the control unit can be configured such that the aforementioned assignment is performed with regard to the contour but not with regard to a hatch pattern of an inner region of the work piece.

In other words, the control unit can be configured such that at least a section of an inner region of the work piece is solidified by the radiation beam of the scanning unit having an angle with regard to the central axis larger than the predefined value.

However, the control unit can also be configured such that the aforementioned assignment is performed with regard to the contour and also with regard to a hatch pattern of an inner region of the work piece.

The control unit may be configured to generate the control data such that a function of the irradiation power with regard to the angle between the radiation beam and the central axis is continuously increasing and/or such that a function of the scan speed of the radiation beam with regard to the angle between the radiation beam and the central axis is continuously decreasing.

In the above cases, it can be guaranteed that, e.g., the irradiated energy density (i.e., irradiated energy divided by irradiation area) is kept constant or substantially constant, due to a decreasing power density of the radiation beam when the angle between the radiation beam and the central axis is increased.

The control unit may be configured to generate the control data such that the irradiation power is set to a constant level for an area where the angle is below a predefined threshold value and wherein the irradiation power is continuously increased for angles above the threshold value such that a higher angle leads to a higher radiation power. Additionally or alternatively, the control unit may be configured to generate the control data such that the scan speed is set to a constant level for an area where the angle is below a predefined threshold value and wherein the scan speed is continuously decreased for angles above the threshold value such that a higher angle leads to a lower scan speed In the above case, it can be decided that the decreasing power density of the radiation beam can be neglected up to a predefined threshold value (i.e., the angle having a predefined threshold value) and that for larger angles, a suitable compensation is performed.

According to a third aspect, a method of producing a three-dimensional work piece is provided. The method comprises receiving work piece data indicative of at least one layer of a three-dimensional work piece to be produced by scanning a radiation beam over an uppermost layer of raw material powder to predetermined sites of the uppermost layer of the raw material powder in order to solidify the raw material powder at the predetermined sites, and assigning at least a part of a contour of a layer of the three-dimensional work piece to at least one scanning unit of an irradiation unit of an apparatus, wherein an axis corresponding to the radiation beam when it impinges on the uppermost layer of raw material powder at an angle of 90° is defined as a central axis for the scanning unit. The method further comprises generating control data for controlling the irradiation unit, the control data defining a scan strategy of the radiation beam such that for more than 50% of a predefined length, the radiation beam moves away from the central axis, the predefined length being defined as a length the radiation beam moves along the contour assigned to the at least one scanning unit, excluding sections concentric with regard to the central axis.

The predefined length may be defined as an entire length the radiation beam moves along the contour assigned to the at least one scanning unit.

With regard to the method of the third aspect, the irradiation unit of the apparatus may comprise a further scanning unit configured to scan a further radiation beam over the uppermost layer of raw material powder to predetermined sites of the uppermost layer of the raw material powder in order to solidify the raw material powder at the predetermined sites. An axis corresponding to the further radiation beam when it impinges on the uppermost layer of raw material powder at an angle of 90° is defined as a further central axis for the further scanning unit. The method of the third aspect may further comprise assigning a part of the contour of the layer of the three-dimensional work piece to the scanning unit, such that an angle between the radiation beam and the central axis stays below a predefined value smaller than a maximum possible deflection angle of the scanning unit, and assigning a further part of the contour to the further scanning unit, such that an angle between the further radiation beam and the further central axis stays below a further predefined value smaller than a maximum possible deflection angle of the further scanning unit.

According to a fourth aspect, a method of producing a three-dimensional work piece is provided. The method comprises receiving work piece data indicative of at least one layer of a three-dimensional work piece to be produced by scanning a radiation beam over an uppermost layer of raw material powder to predetermined sites of the uppermost layer of the raw material powder in order to solidify the raw material powder at the predetermined sites, and assigning at least a part of a contour of a layer of the three-dimensional work piece to at least one scanning unit of an irradiation unit of an apparatus, wherein an axis corresponding to the radiation beam when it impinges on the uppermost layer of raw material powder at an angle of 90° is defined as a central axis for the scanning unit. The irradiation unit of the apparatus comprises a further scanning unit configured to scan a further radiation beam over the uppermost layer of raw material powder to predetermined sites of the uppermost layer of the raw material powder in order to solidify the raw material powder at the predetermined sites. An axis corresponding to the further radiation beam when it impinges on the uppermost layer of raw material powder at an angle of 90° is defined as a further central axis for the further scanning unit. The method of the fourth aspect further comprises assigning a part of the contour of the layer of the three-dimensional work piece to the scanning unit, such that an angle between the radiation beam and the central axis stays below a predefined value smaller than a maximum possible deflection angle of the scanning unit, and assigning a further part of the contour to the further scanning unit, such that an angle between the further radiation beam and the further central axis stays below a further predefined value smaller than a maximum possible deflection angle of the further scanning unit.

The method of the third aspect or the fourth aspect may further comprise generating control data for controlling the irradiation unit, the control data defining a scan strategy of the radiation beam such that an irradiation power of the radiation beam and/or a scan speed of the radiation beam is adapted based on an angle between the radiation beam and the central axis, such that the irradiation power is increased when the angle increases and/or the scan speed is decreased when the angle increases.

Further, the optional details and further aspects described above with regard to the apparatus of the first and second aspect may also apply to the method of the third and/or fourth aspect. The method of the third aspect may be carried out by the apparatus of the first aspect. The method of the fourth aspect may be carried out by the apparatus of the second aspect.

According to a fifth aspect, a computer program product stored on a computer-readable storage medium is provided. The computer program product comprises computer-readable instructions for causing a computer to carry out the method according to the third aspect or the fourth aspect.

Preferred embodiments of the invention are described in greater detail with reference to the appended schematic drawings, wherein.

Figure 1:
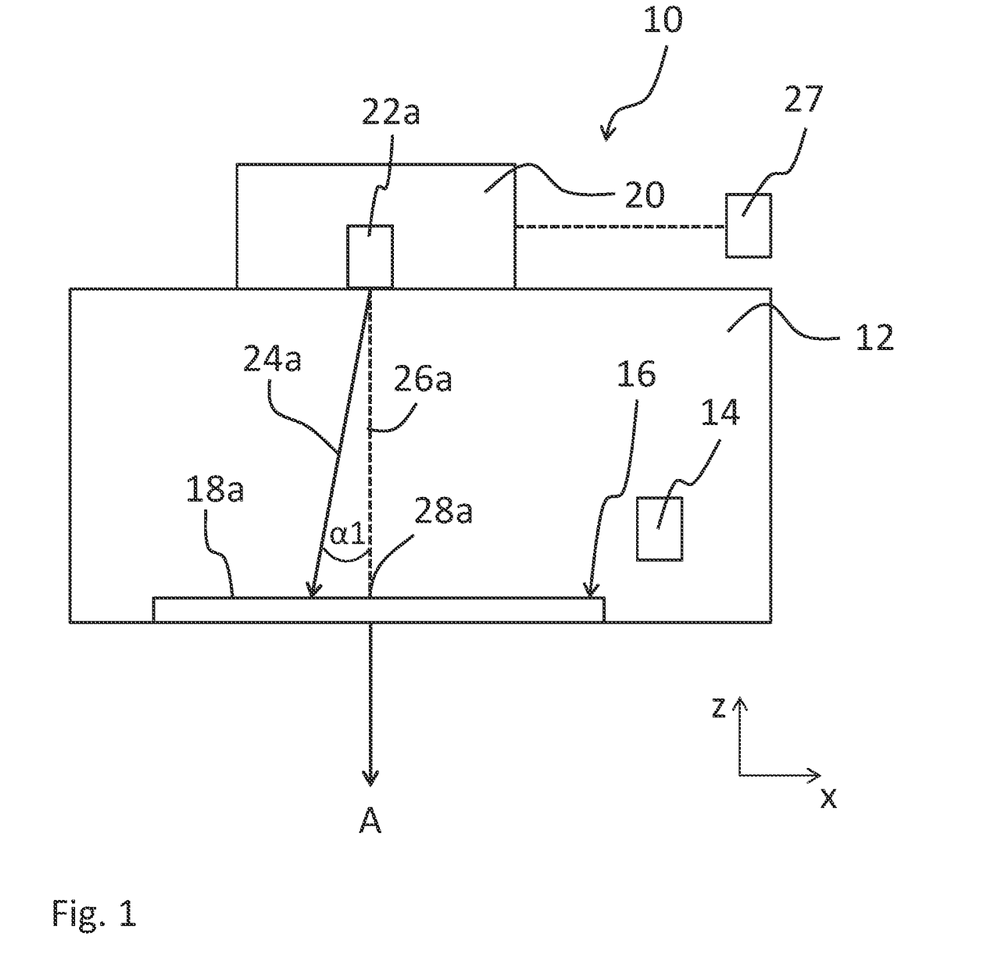
FIG. 1 shows a schematic representation of an apparatus for producing a three-dimensional work piece according to an embodiment of the present disclosure.

FIG. 1 shows an apparatus 10 for producing a three-dimensional work piece by selective laser melting. The apparatus 10 comprises a process chamber 12. The process chamber 12 is sealable against the ambient atmosphere, i.e. against the environment surrounding the process chamber 12. A powder application device 14, which is dis-posed in the process chamber 12, serves to apply a raw material powder onto a carrier 16. As indicated by an arrow A in FIG. 1, the carrier 16 is designed to be dis-placeable in a vertical direction so that, with increasing construction height of a work piece, as it is built up in layers from the raw material powder on the carrier 16, the carrier 16 can be moved downwards in the vertical direction. Since the movability of the carrier 16 is well-known in the field of selective laser melting, it will not be explained in detail herein. As an alternative to the movable carrier 16, the carrier 16 may be provided as stationary (or fixed) carrier (in particular, with regard to the vertical z-direction), wherein the irradiation unit 20 (see below) is configured to be moved upwards during the build process (i.e., with increasing construction height of the work piece).

The surface of the carrier 16 defines a horizontal plane in the x-y-directions, wherein a direction perpendicular to said plane is defined as a z-direction. Hence, each uppermost layer of raw material powder extends in a plane parallel to the horizontal plane (x-y-plane) defined above.

The apparatus 10 further comprises an irradiation unit 20 for selectively irradiating laser radiation onto the raw material powder applied onto the carrier 16. By means of the irradiation unit 20, the raw material powder applied onto the carrier 16 may be subjected to laser radiation in a site-selective manner in dependence on the desired geometry of the work piece that is to be produced.

The irradiation unit 20 comprises a scanning unit 22a. The scanning unit 22a is associated with an irradiation area 18a defined on the surface of the carrier 16 and is configured to selectively irradiate an electromagnetic or particle radiation beam 24a onto the raw material powder applied onto the irradiation area 18a.

The Irradiation unit 20 comprises at least one laser beam source (not shown), from which the radiation beam is directed to the scanning unit 22a. The laser beam source may, for example, comprise a diode pumped Ytterbium fibre laser emitting laser light at a wavelength of approximately 1070 to 1080 nm.

Further, the irradiation unit 20 may comprise, in addition to the scanning unit 22a, a beam expander for expanding the radiation beam and/or an object lens. Alternatively, the optical unit may comprise a beam expander including a focusing optic and the scanning unit 22a. By means of the scanning unit 22a, the position of the focus of the radiation beam both in the direction of the beam path and in a plane substantially perpendicular to the beam path (i.e., in the x-y-plane) can be changed and adapted.

The scanning unit 22a may be designed in the form of a galvanometer scanner and the object lens may be an f-theta object lens provided in the beam path after the scanning unit 22a. The operation of the irradiation unit 20 is controlled by means of a control device 27.

The scanning unit 22a is configured to deflect the radiation beam to predefined sites on the uppermost layer of the raw material powder, i.e., to sites defined by the control unit 27, such that the desired work piece is produced. For the scanning unit 22a, a central axis 26a can be defined as indicated by the dashed line in FIG. 1. The central axis 26a is defined as a beam path of the radiation beam 24a coming from the scanning unit 22a, when it impinges on the uppermost layer of raw material powder at an angle of 90°. In other words, the central axis 26a is a surface normal of the uppermost layer of raw material powder (i.e., of the x-y-plane) extending into the z-direction and interesting the scanning unit 26a. A point where the central axis 26a intersects the uppermost layer of raw material powder may be defined as center point 28a. Thus, the central axis 26a may be defined by an imaginary radiation beam, or, in other words, by the radiation beam 24a in a particular setting of the scanning unit 22a. When the radiation beam 24a is irradiated onto the raw material powder, it forms an angle $\alpha 1$ with regard to the central axis 26a. This angle will be referred to as deflection angle $\alpha 1$ of the radiation beam 24a.

Due to the physical properties of the scanning unit 22a, the deflection angle $\alpha 1$ is limited both in the x-direction and in the y-direction. This maximum possible deflection angle may limit the footprint of the work piece to be produced. In other words, a size of a layer of the work piece may be limited by the maximum possible deflection angle. Therefore, the size (area) of the carrier 16 is usually approximately fitted to the maximum possible deflection angle, such that no area is wasted that cannot be irradiated.

Figure 2:
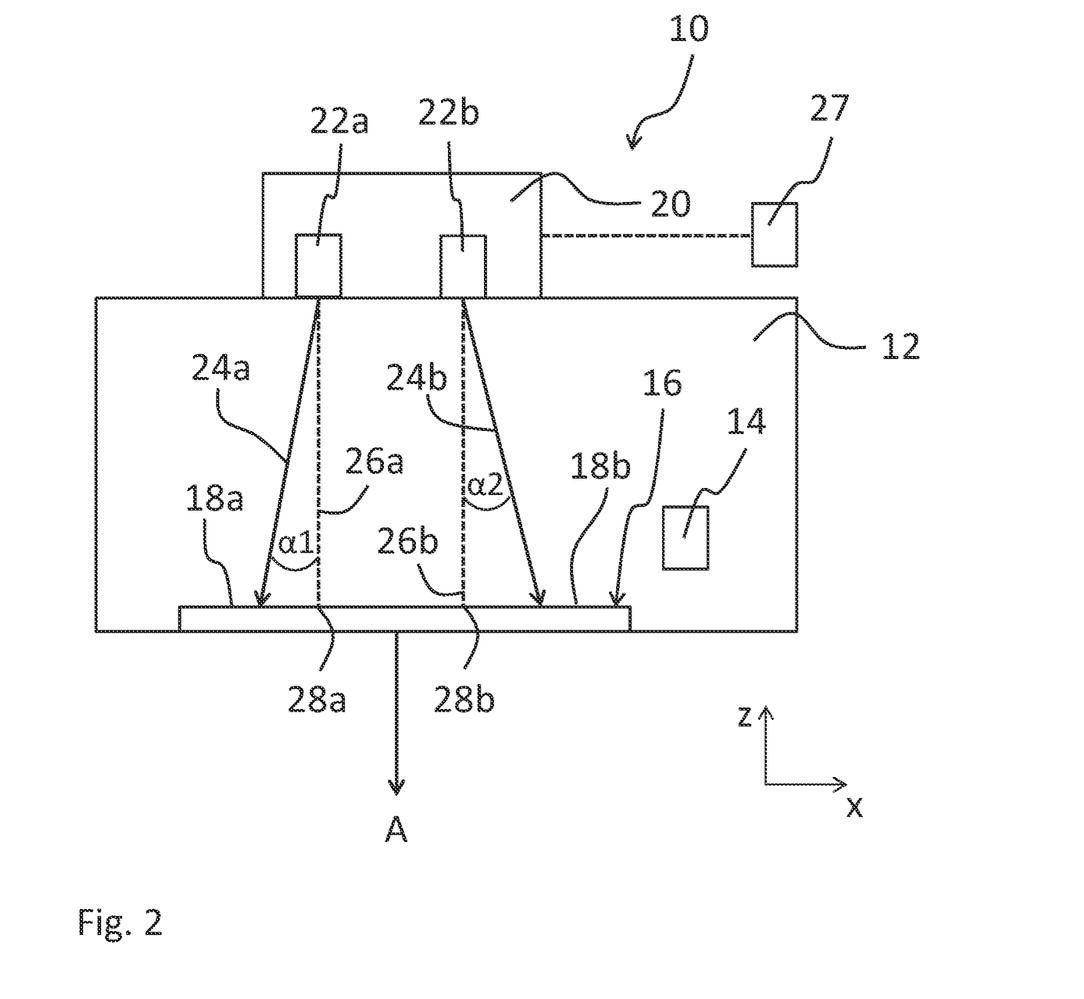
FIG. 2 shows a schematic representation of an apparatus for producing a three-dimensional work piece according to an embodiment of the present disclosure.

An option to increase the maximum possible footprint of the work piece to be produced is shown in FIG. 2. FIG. 2 shows an apparatus 10 for producing a three-dimensional work piece according to another embodiment of the present disclosure.

The apparatus 10 of FIG. 2 is similar to the apparatus 10 of FIG. 1. Therefore, only the differences will be discussed below, wherein the remaining elements are the same as discussed with regard to FIG. 1. Like elements are indicated by like reference signs.

The main difference between the apparatus 10 of FIG. 2 and the apparatus 10 of FIG. 1 is that the irradiation unit 20 of the apparatus 10 of FIG. 2 comprises an additional (further) scanning unit 22b. The further scanning unit 22b is positioned next to the scanning unit 22a. The further scanning unit 22b is also controlled by the control unit 27 and is configured to scan a further radiation beam 24b over the uppermost layer of raw material powder.

As becomes apparent from FIG. 2, a first and a second irradiation area 18a, 18b is defined on the surface of the carrier 16. The first irradiation area 18a is an area that is assigned to the radiation beam 24a of the scanning unit 22a and the second irradiation area 18b is an area that is assigned to the further radiation beam 24b of the further scanning unit 22b.

The first scanning unit 22a is associated with the first irradiation area 18a defined on the surface of the carrier 16 and is configured to selectively irradiate an electromagnetic or particle radiation beam 24a onto the raw material powder applied onto the first irradiation area 18a. The second scanning unit 22b is associated with the second irradiation area 18b defined on the surface of the carrier 16 and is configured to selectively irradiate an electromagnetic or particle radiation beam 24b onto the raw material powder applied onto the second irradiation area 18b.

The irradiation unit 20 may comprise one or more laser beam source(s) for each of the scanning units 22a and 22b. It is, however, also conceivable that the scanning units 22a, 22b are associated with a single laser beam source, wherein a radiation beam provided by the single radiation beam source, by suitable means such as, for example, beam splitters and/or mirrors, may be split and/or deflected as required so as to direct the radiation beam provided by the radiation beam source to the scanning units 22a, 22b. A laser beam source associated with only one scanning unit 22a, 22b or with both scanning units 22a, 22b may, for example, comprise a diode pumped Ytterbium fibre laser emitting laser light at a wavelength of approximately 1070 to 1080 nm.

Further, the irradiation unit 20 may comprise, for each scanning unit 22a, 22b, an optical unit for guiding and/or processing a radiation beam emitted by the radiation beam source and supplied to the scanning unit 22a, 22b. The optical unit may comprise, in addition to the scanning unit 22a, 22b, a beam expander for expanding the radiation beam and/or an object lens. Alternatively, the optical unit may comprise a beam expander including a focusing optic and the scanning unit 22a, 22b. By means of the scanning units 22a, 22b, the position of the focus of the radiation beams 24a, 24b both in the direction of the beam path and in a plane perpendicular to the beam path can be changed and adapted. The scanning units 22a, 22b may be designed in the form of galvanometer scanners and the object lenses may be f-theta object lenses. The operation of the irradiation unit 20 is controlled by means of a control device 27.

By means of the control device 27, each scanning unit 22a, 22b is controlled such that the radiation beam 24a, 24b emitted by the scanning unit 22a, 22b is irradiated onto the raw material powder applied onto the irradiation area 18a, 18b associated with the scanning unit 22a, 22b in a site selective manner and independent of the irradiation of the other irradiation area 18a, 18b not associated with the scanning unit 22a, 22b in question. In other words, each irradiation area 18a, 18b defined on the carrier 16 is individually and independently irradiated using a desired irradiation pattern. Thus, a large three-dimensional work piece may be built-up on the carrier 16 in an additive layer construction process within a relatively short time and at reason-able costs, e.g., by simultaneously irradiating the first and the second irradiation area 18a, 18b defined on the carrier 16 with electromagnetic or particle radiation emitted by the scanning units 22a, 22b.

The irradiation areas 18a, 18b may overlap each other and form an overlap area defined on the surface of the carrier 16. Raw material powder applied onto the overlap area is selectively irradiatable with electromagnetic or particle radiation by both scanning units 22a, 22b of the irradiation unit 20. The overlap area may have the form of a stripe which is arranged as part of the first and the second irradiation area 18a, 18b.

Further, also the further scanning unit 22b defines a further central axis 26b corresponding to the definition of the central axis 26a of the scanning unit 22a. Similarly, also a further center point 28b is defined at a point of intersection of the further central axis 26b and the uppermost layer of raw material powder. A deflection angle of the further radiation beam 24b is indicated as $\alpha 2$.

The general arrangement and, in particular, the optical structure of the apparatuses of FIG. 1 and FIG. 2 are known in the art. The present disclosure rather focuses on details of the control performed by the control unit 27 of the respective devices, as will be explained below.

Firstly, however, physical observations will be discussed, which may negatively affect the built quality of the produced work piece, e.g., with regard to a surface roughness of the surface of the work piece. These problems may occur with regard to the scanning unit 22*a* of the devices 10 of FIG. 1 and FIG. 2 and may occur accordingly with regard to the further scanning unit 22*b* of the apparatus 10 of FIG. 2.

Figure 3:
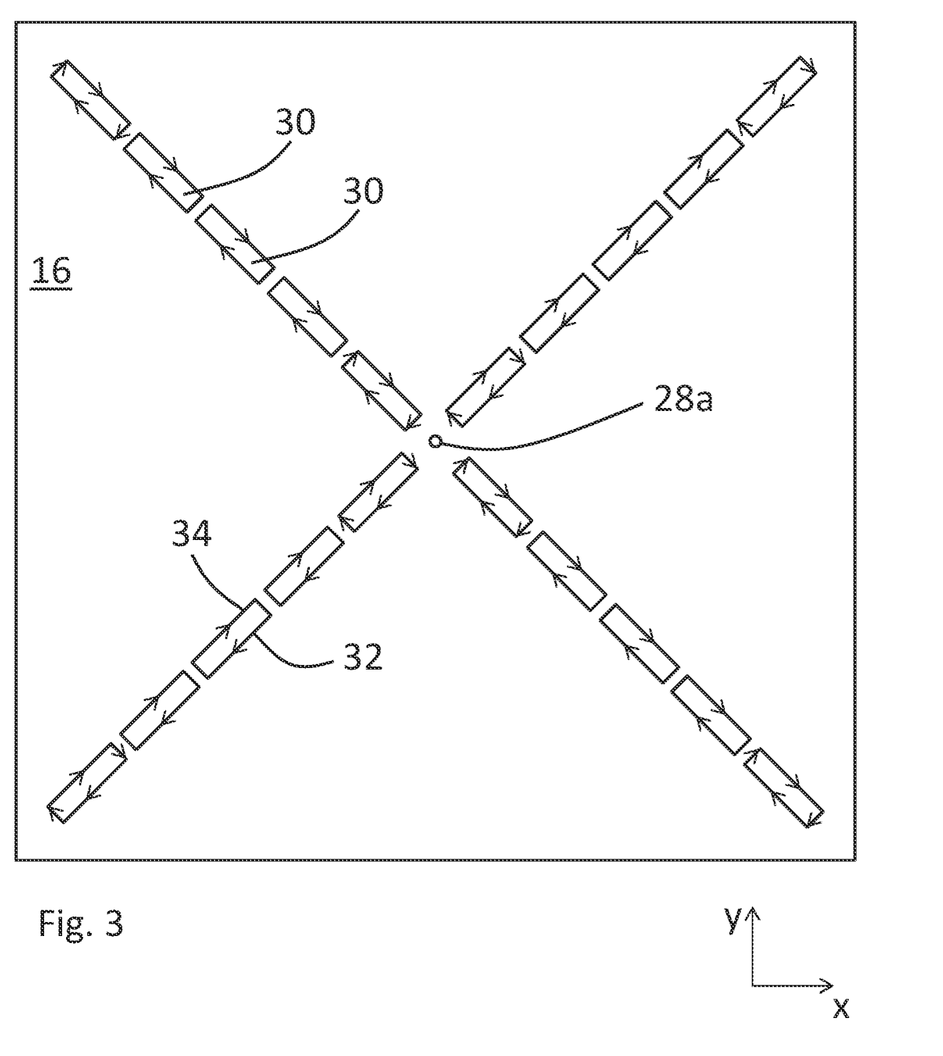
FIG. 3 shows a test structure that was produced in order to measure the surface roughness of the test structure in dependence of different parameters.

FIG. 3 shows a test structure that was produced in order to observe the influence of a scanning direction (i.e., piercing direction or dragging direction) and a distance from the center point 28*a* to the surface roughness of the generated work piece. The shown test structure was illuminated in multiple layers which led to the production of multiple (20) rectangular blocks 30 of solidified metal material on the carrier 16.

FIG. 3 shows an example, according to which the test structure was produced on the carrier 16 with an apparatus 10 having one scanning unit 22*a*, as shown in FIG. 1. However, the physical observations described below also apply accordingly to apparatuses having multiple scanning units as discussed above, e.g., with regard to FIG. 2.

The blocks 30 are filled with a hatch pattern. In other words, the blocks 30 consist of an inner part (i.e., a core) that is filled with a hatch pattern (e.g., a stripe pattern) and an outer part (i.e., a shell) that is defined by a contour and irradiated and solidified by the radiation beam 24*a* along a predefined direction. Since the following observations focus on the surface roughness, the hatch pattern will not be further discussed in detail and it is rather focused on the contour that defines the surface of the produced work pieces (i.e., the blocks 30).

The scanning direction of the multiple blocks 30 is indicated in FIG. 3 by arrows. In each layer, the same scanning direction has been used. As shown in FIG. 3, a continuous scan pattern has been used for each of the contours of the blocks 30. In other words, the scanning direction for the contours of the blocks 30 is circumferential. In the example shown in FIG. 3, the contours of the blocks 30 have been irradiated in a clockwise direction. As a result, each block 30 has a side surface 32 irradiated in a piercing direction and a side surface 34 irradiated in a dragging direction.

The piercing direction is defined as a direction away from the center point 28*a*. In other words, when the radiation beam 24*a* moves in the piercing direction, a distance between the center point 28*a* and a spot position of the radiation beam 24*a* increases. In contrast to that, the dragging direction is defined as a direction towards the center point 28*a*. In other words, when the radiation beam 24*a* moves in the dragging direction, a distance between the spot position of the radiation beam 24*a* and the center point 28*b* decreases.

Figure 4:
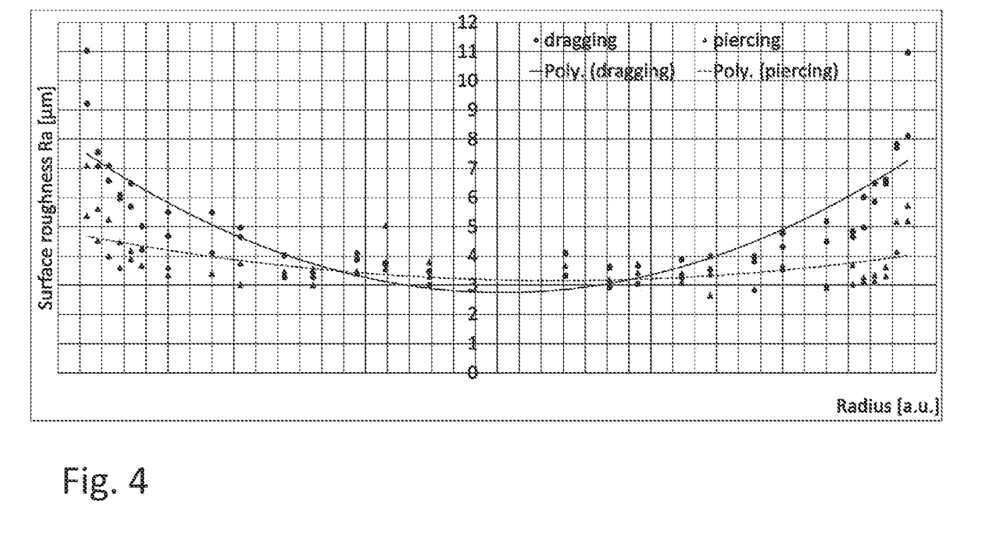
FIG. 4 shows a diagram with the results of the surface roughness measurements performed on the test structure of FIG. 3.

FIG. 4 shows a diagram with an evaluation of a surface roughness that has been measured at multiple points on the side surfaces of the test structure shown in FIG. 3. In the following, the side surfaces of the test structure (and, therefore, the side surfaces of the blocks 30) are defined as the larger surfaces extending substantially in a radial direction with regard to the center point 28*a*.

Firstly, the diagram shows a plot of surface roughness values (Ra In μm) in dependence on a radius (in arbitrary units, a.u.), i.e. a distance r from the center point 28*a*. From FIGS. 1 and 2, it is clear that an increasing radius also means an increasing deflection angle α1:

$$r = d^*\tan(\alpha 1),$$

wherein d is a distance between the scanning unit 22*a* and the uppermost layer of raw material powder.

Further, the diagram differentiates between values obtained on a surface that was solidified in a piercing direction and those obtained on a surface that was solidified in a dragging direction. These values are depicted by different symbols (piercing direction; triangle, dragging direction; circle). For both directions (i.e., piercing and dragging), a corresponding polynomial regression curve was calculated and plotted in the diagram of FIG. 4 (piercing direction: dashed line, dragging direction: solid line).

Based on the results shown in FIG. 4, two main observations can be made:

Observation 1: For both directions (piercing and dragging), the surface roughness Ra increases with increasing distance from the center point 28*a*. In other words, when the deflection angle α1 increases, the surface roughness increases and, therefore, deteriorates.

Observation 2: Throughout the entire range of radius values, the side surfaces 32 that were illuminated in a piercing direction have a significantly better (i.e., lower) surface roughness.

Possible explanations for the above observations 1 and 2 include the increasing ec-centricity of the (elliptical) radiation spot 24*a* with increasing deflection angles α1 and/or an asymmetric intensity distribution of the radiation spot 24*a* within the ellipse.

The technique of the present disclosure may solve at least one of the aforementioned problems occurring in relation with observation 1 and observation 2. The technique of the present disclosure may be implemented in the apparatus 10 of FIG. 1 and/or in the apparatus 10 of FIG. 2.

A first embodiment of the present disclosure will be described in the following with reference to the apparatus 10 of FIG. 1. The control unit 27 is configured to receive work piece data indicative of at least one layer of the three-dimensional work piece to be produced. This work piece data may be provided in the form of CAD data. The data is either already provided in the form of individual layers or it is processed by the control unit 27 to define individual layers of the work piece to be produced.

The control unit 27 is further configured to assign at least part of a contour of the layer of the three-dimensional work piece to the scanning unit 22*a*. In the case that only one scanning unit 22*a* is provided (see FIG. 1), the entire contour is assigned to the one scanning unit 22*a*. In other words, the entire work piece and, thus, the entire contour of the work piece is solidified by the scanning unit 22*a*.

The control unit 27 is further configured to generate control data for controlling the irradiation unit, the control data defining a scan strategy of the radiation beam 24*a* such that for more than 50% of a predefined length, the radiation beam 24*a* moves away from the central axis 28*a*. According to an embodiment, the predefined length is defined as a length the radiation beam moves along the contour assigned to the at least one scanning unit, excluding sections concentric with regard to the central axis. According to a further embodiment, these "concentric sections" are not excluded. In other words, according to the further embodiment, the predefined length is defined as an entire length the radiation beam moves along the contour assigned to the at least one scanning unit.

In other words, the control unit 27 processes the three-dimensional work piece data and "translates" it to control data defining a scan strategy for each layer of the work piece to be produced. According to the present embodiment, the scan strategy is defined such, that for more than 50% of the length of the contour, the contour is solidified in a piercing direction. According to prior art scan strategies, the contour of a work piece may be solidified by a radiation beam for 50% of its length in a piercing direction and for 50% of its length in a dragging direction. This is, e.g., the case for the scan strategy as shown in FIG. 3, where each block 30 is irradiated in a clockwise direction without any jump of the radiation beam. In the prior art, this scan strategy is applied because it reduces the jumps of the radiation beam and the radiation beam can be continuously moved over the raw material powder while solidifying the powder.

Hence, the scan strategy according to the present embodiment may make it necessary to increase a number of jumps of the radiation beam 24a (i.e., a number of times the radiation beam 24a is moved from a solidifying end point to a solidifying start point without solidifying raw material powder between these points). However, as a result, the surface roughness of the produced work pieces may decrease, which expresses an improved surface quality.

With regard to the test structure shown in FIG. 3, the scan strategy according to the present embodiment may, e.g., be defined such that each of the side surfaces of the work pieces (the blocks 30) is irradiated in a piercing direction, i.e., away from the center point 28a. The surfaces connecting the side surfaces and facing towards and away from the center point 28a, can be irradiated in a direction that minimizes jumps of the radiation beam 24a. Since these surfaces extend tangentially with regard to the center point 28a, the scanning direction of these surfaces has not such a strong influence on the surface quality as it is the case for the side surfaces. In case the side surfaces are irradiated in a piercing direction, clearly more than 50% of the contour of the work piece (i.e., each individual block 30) is irradiated in a piercing direction and the surface quality of these side surfaces can be enhanced.

With regard to the concentric sections, it is noted that FIG. 3 does not show such concentric sections (i.e. sections of a contour concentric with regard to the center point 28a). These concentric sections (or circular sections) could be excluded from the determination of the "at least 50%" criterion, since they do not contribute to the problem discussed herein. In other words, these sections have no radial component and, therefore, the laser beam cannot move in a "dragging direction" or "piercing direction" along these sections. However, according to the further embodiment, these circular sections are not excluded, such that the "more than 50%" criterion is applied to the entire length of the assigned contour, which increases the length that has to be irradiated in a piercing direction, in case one or more of such concentric sections are present.

Depending on the situation, it may be beneficial to increase the aforementioned lower limit of 50%. For example, the limit can be set to 60%, 70%, 80%, or 90%, depending on the situation and, in particular, depending on a geometrical structure of the work piece and/or depending on other physical parameters of the radiation beam 24a. In some cases, it is even possible to define a scan strategy, according to which the entire contour (i.e., 100% of the contour assigned to the respective scanning unit 22a) is irradiated in a piercing direction. Since the surface quality can be improved when the respective surface is irradiated in a piercing direction, increasing the lower limit may lead to an improved surface quality of the entire work piece.

A second embodiment of the present disclosure will be described in the following with reference to the apparatus 10 of FIG. 2. The second embodiment is similar to the first embodiment and, therefore, only details regarding the differences and/or additional features will be described in the following.

The control unit 27 of the apparatus 10 is configured to receive work piece data indicative of at least one layer of the three-dimensional work piece to be produced.

The control unit 27 is further configured to assign a part of a contour of the layer of the three-dimensional work piece to the scanning unit 22a. The control unit 27 further assigns a further part of the contour to the further scanning unit 22b. Thus, the contour of the work piece is split up into a first section and a second section, wherein the first section is irradiated by the first scanning unit 22a and the second section is irradiated by the second scanning unit 22b.

The control unit 27 is further configured to generate control data for controlling the irradiation unit 20, the control data defining a scan strategy of the radiation beam 24a such that for more than 50% of a predefined length, the radiation beam 24a moves away from the central axis 26a. According to an embodiment, the predefined length is defined as a length the radiation beam 24a moves along the contour assigned to the scanning unit 22a, excluding sections concentric with regard to the central axis 26a. According to a further embodiment, these "concentric sections" are not excluded. In other words, according to the further embodiment, the predefined length is defined as an entire length the radiation beam 24a moves along the contour assigned to the scanning unit 22a. The control data further defines the scan strategy such that for more than 50% of a predefined length, the radiation beam 24b moves away from the central axis 26b of the further scanning unit 22b. According to an embodiment, the predefined length is defined as a length the further radiation beam 24b moves along the contour assigned to the further scanning unit 22b, excluding sections concentric with regard to the central axis 26b. According to a further embodiment, these "concentric sections" are not excluded. In other words, according to the further embodiment, the predefined length is defined as an entire length the further radiation beam 24b moves along the contour assigned to the further scanning unit 22b.

Thereby, each of the scanning units 22a and 22b applies, for the section of the contour assigned to the respective scanning unit 22a, 22b, a scan strategy having the above-described limitations regarding the scanning direction. More precisely, each of the scanning units 22a, 22b Irradiates the corresponding section of the contour in a way such that more than 50% of the respective section is irradiated in a piercing direction. As described above with regard to the first embodiment, this lower limit of 50% can be increased to 60%, 70%, 80%, or 90%, or even 100%.

By implementing the above technique, a quality of the work piece can be increased and, in particular, a surface roughness of a surface of the work piece can be decreased.

In the following, a third embodiment will be described with reference to FIG. 2.

As described above with reference to FIG. 2, the irradiation unit 20 of the apparatus 10 comprises a further scanning unit 22b configured to scan a further radiation beam 24b over the uppermost layer of raw material powder to predetermined sites of the uppermost layer of the raw material powder in order to solidify the raw material powder at the predetermined sites. An axis corresponding to the further radiation beam 24*b* when it impinges on the uppermost layer of raw material powder at an angle of 90° is defined as a further central axis 26*b* for the further scanning unit 24*b*.

The control unit 27 is configured to assign a part of the contour of the layer of the three-dimensional work piece to the scanning unit 22*a*, such that an angle between the radiation beam 24*a* and the central axis 26*a* stays below a predefined value smaller than a maximum possible deflection angle of the scanning unit 22*a*. The control unit 27 is further configured to assign a further part of the contour to the further scanning unit 22*b*, such that an angle between the further radiation beam 24*b* and the further central axis 26*b* stays below a further predefined value smaller than a maximum possible deflection angle of the further scanning unit 22*b*.

In other words, the contour of the work piece is split up in a way such that the section assigned to the scanning unit 22*a* is irradiated with deflection angles α1 that stay below a predefined value and the section assigned to the further scanning unit 22*b* is irradiated with deflection angles α2 that stay below a further predefined value.

Figure 5:
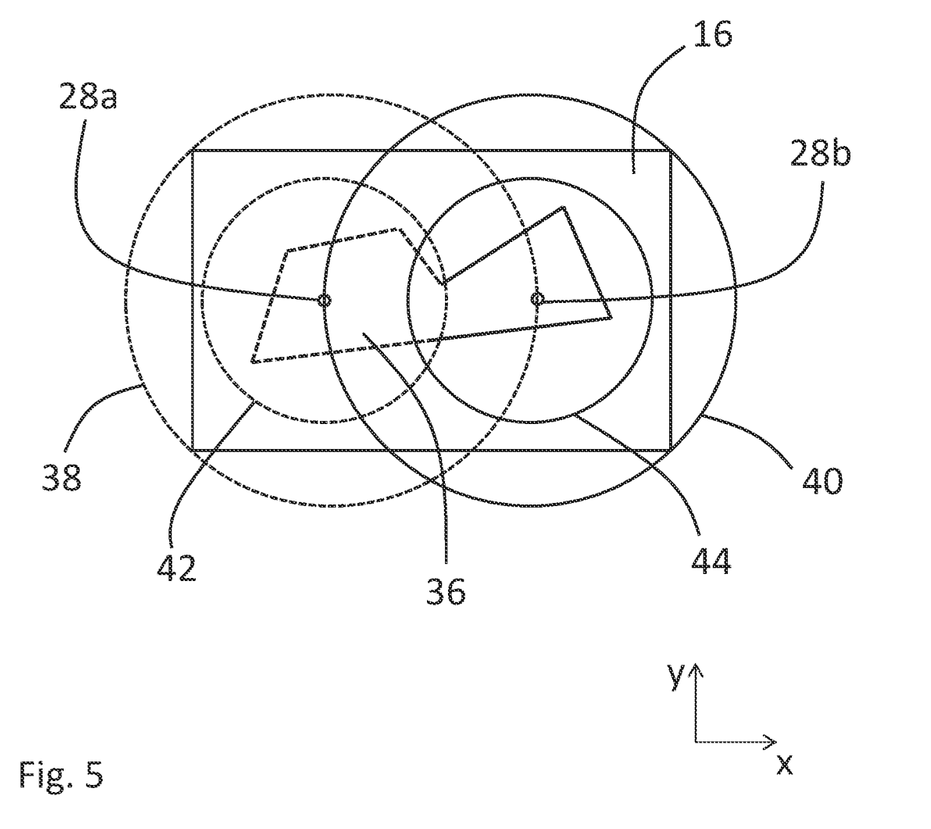
FIG. 5 shows an example according to an embodiment of the present disclosure, how a contour of a work piece may be split up and assigned to different scanning units.

FIG. 5 shows an example of the technique according to the third embodiment.

FIG. 5 shows a top view of the carrier 16 with the contour of a work piece 36 to be produced. Further, the center points 28*a* and 28*b* of the corresponding scanning units 22*a* and 22*b* are indicated. The scanning unit 22*a* has a maximum possible deflection angle which leads to a maximum possible radius 38 indicated by a dashed line. Similarly, the scanning unit 22*b* has a maximum possible deflection angle which leads to a maximum possible radius 40 indicated by a solid line.

However, the deflection angle of the scanning unit 22*a* is limited to a predefined value, which leads to a predefined maximum radius 42. The deflection angle of the further scanning unit 22*b* is limited to a further predefined value, which leads to a further predefined maximum radius 44. The predefined value and/or the further predefined value is a value in a range between 10° to 25° and, in particular, in a range between 15° and 20°. In an embodiment, the predefined value is 18.25°.

It should be noted that the circular representation with regard to the areas indicated by reference signs 38, 40, 42, and 44 is only an example. For example in case two deflection mirrors are used per scanning unit (e.g., for scanning in x-direction and y-direction, respectively), the circles shown in FIG. 4 may be replaced by squares. In that case, limiting the deflection angle may mean that a side length of a square region that may be irradiated is reduced.

The contour of the work piece 36 is assigned to the respective scanning units 22*a* and 22*b* such that each scanning unit 22*a* and 22*b* only irradiates sections of the contour of the work piece 36 at angles below the respective predefined values. The section of the contour of the work piece 36 assigned to the scanning unit 22*a* is indicated by a dashed line and the section of the contour of the work piece 36 assigned to the further scanning unit 22*b* is indicated by a solid line.

As can be seen in FIG. 5, an overlap area exists within the circles indicating the predefined maximum radius 42, 44, such that the work piece 36 can be reliably and continuously produced.

Further, according to the example shown in FIG. 5 and according to the technique of the third embodiment, inner parts of the work piece 36 can be assigned to a scanning unit, such that the scanning unit irradiates the inner part with a deflection angle larger than the predefined value. In the representation of FIG. 5, this means that the area between the inner circle 42 and the outer circle 38 can be used for solidifying an inner part of the work piece 36. The same holds for the area between the inner circle 44 and the outer circle 40.

According to the above technique, the deflection angles of the respective scanning unit stay below a respective value. Hence, in particular, the problem described above with regard to observation 2 can be reduced or eliminated.

According to a fourth embodiment, the second embodiment and the third embodiment are combined such that the contour of the work piece is split up as described with regard to the third embodiment and the scanning direction for the respective scanning units 22*a*, 22*b* is set such that the corresponding contour is solidified for more than 50% of its length in a piercing direction.

According to a further improvement of the above technique, each of the above-described embodiments can be modified such that the control data defines the scan strategy of the radiation beam 24*a* such that an irradiation power of the radiation beam 24*a* and/or a scan speed of the radiation beam 24*a* is adapted based on an angle α1 between the radiation beam 24*a* and the central axis 26*a*, such that the irradiation power is increased when the angle α1 increases and/or the scan speed is decreased when the angle α1 increases. The same can be done for the further radiation beam 24*b* of further scanning unit 22*b*, if existent.

Since the energy density of the irradiation spot may decrease when the angle at increases (due to a larger spot area A at the layer of raw material powder), the aforementioned measures may help to maintain a constant or substantially constant amount of energy irradiated per unit area. In this case, the physical properties of the solidification process may be kept constant and, in particular, the problem described with regard to observation 2 can be reduced or eliminated.

According to a further modification, the control unit is configured to, based on the work piece data, determine a thickness of the work piece in at least one region where the radiation beam 24*a* is to be irradiated, decide whether the thickness is below a predefined threshold value, and, when the thickness is below the predefined threshold value, generate the control data for the at least one region such that the irradiation power is not increased in this region. Hence, for regions having a higher wall thickness, the irradiation power may be increased as described above, and for regions having a lower wall thickness (below the threshold value), the irradiation power is not increased in order not to destroy the work piece in these (thin) regions.

According to an embodiment, a function of the irradiation power with regard to the angle α1 between the radiation beam 24*a* and the central axis 26*a* is continuously increasing. Further, according to an embodiment, a function of the scan speed of the radiation beam 24*a* with regard to the angle α1 between the radiation beam 24*a* and the central axis 26*a* is continuously decreasing. More precisely, the functions may be monotonic functions.

Further, the functions may be defined such that the irradiation power is set to a constant level for an area where the angle α1 is below a predefined threshold value and wherein the irradiation power is continuously increased for angles above the threshold value such that a larger angle leads to a higher radiation power.

Figure 6:
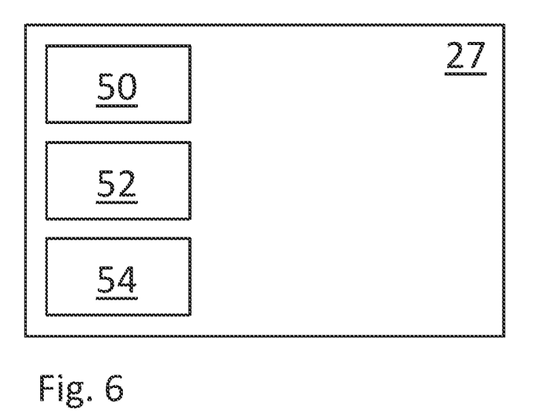
FIG. 6 shows a control unit of an apparatus according to an embodiment of the present disclosure.

As already indicated above, according to the first and second embodiment, the operation of the irradiation system 20 of FIG. 1 and FIG. 2, respectively, is controlled by means of the control device 27 which, in a schematic representation, is depicted in greater detail in FIG. 6. The various units of the control device 27 shown in FIG. 6 and described in the following may be implemented in hardware or software as desired.

The control device 27 comprises a receiving unit 50 configured to receive work piece data indicative of at least one layer of the three-dimensional work piece to be produced. The control unit 27 further comprises an assigning unit 52 configured to assign at least a part of a contour of the layer of the three-dimensional work piece to the at least one scanning unit 22a. The control unit 27 further comprises a generating unit 54 configured to generate control data for controlling the irradiation unit 20, the control data defining a scan strategy of the radiation beam 24a such that for more than 50% of a predefined length, the radiation beam 24a moves away from the central axis 26a. According to an embodiment, the predefined length is defined as a length the radiation beam 24a moves along the contour assigned to the at least one scanning unit 22a, excluding sections concentric with regard to the central axis. According to a further embodiment, these "concentric sections" are not excluded. In other words, according to the further embodiment, the predefined length is defined as an entire length the radiation beam 24a moves along the contour assigned to the at least one scanning unit 22a.

Figure 7:
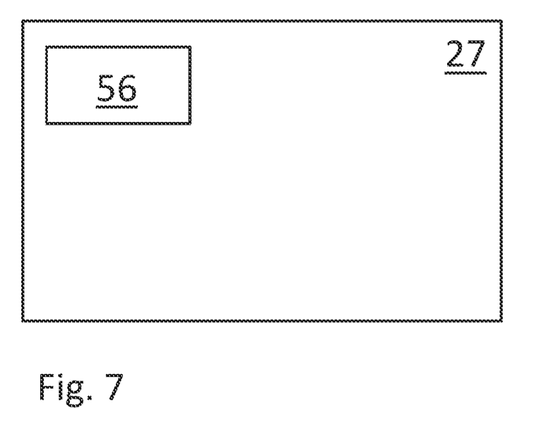
FIG. 7 shows a control unit of an apparatus according to an embodiment of the present disclosure.

As already indicated above, according to the third embodiment, the operation of the irradiation system 20 of FIG. 2 is controlled by means of the control device 27 which, in a schematic representation, is depicted in greater detail in FIG. 7. The unit of the control device 27 shown in FIG. 7 and described in the following may be implemented in hardware or software as desired. The control device 27 comprises an assigning unit 56 configured to assign a part of the contour of the layer of the three-dimensional work piece to the scanning unit 22a, such that an angle between the radiation beam 24a and the central axis 26a stays below a predefined value smaller than a maximum possible deflection angle of the scanning unit 22a, and to assign a further part of the contour to the further scanning unit 22b, such that an angle between the further radiation beam 24b and the further central axis 26b stays below a further predefined value smaller than a maximum possible deflection angle of the further scanning unit 22b.

As described above with regard to the fourth embodiment, the control units 27 of FIG. 6 and FIG. 7, can be combined such that the combined control unit 27 comprises units having the functionality of each of the units 50, 52, 54, and 56 described above.

With the technique discussed above, one or more work pieces can be generated having an improved quality and, in particular having an improved surface quality and a reduced surface roughness.

It should be noted that improving the surface roughness, as described by the above technique, might only be one aspect of an optimization problem. The optimization problem can be solved by a user or by a machine operator (that might be part of a control software of the apparatus). More precisely, there may be different competing aspects of the optimization problem, wherein an improvement of one of these aspects may lead to a deterioration of another aspect. In an example, these aspects are: (a) obtaining an improved/reduced surface roughness, (b) reducing the build time, and (c) decreasing a visible overlap between parts irradiated by different radiation beams/lasers.

Aspect (a) may be solved by the technique discussed above. Aspect (b) may be addressed by providing as many scanning units and, therefore, as many radiation beams as possible for simultaneously solidifying different parts of the work piece and, in particular, of the contour. Aspect (c) may be addressed by providing a reduced number of scanning units (and radiation beams) for solidifying the contour, such that as few as possible misalignments occur (e.g., only one radiation beam is used for irradiating the contour).

In view of the above, in some applications it might be advantageous to expose a contour of a three-dimensional work piece with only one laser even if the build time and the deflection angle is then increased. The surface roughness would be higher at higher deflection angles but the surface quality at possible connection points between lasers (if more lasers would expose the contour) would be better because of no visible overlap/no misalignment.

The user/machine operator is able to weight between different scan strategies for the contour in the control software. Parallel to this weighting a piercing scanning direction and an increased energy input with higher deflection angle is still favorable/applicable.

In other words, in some occasions, it might be advantageous not to perform the surface roughness optimization described herein to a maximum extend, in favor of other aspects to be optimized.

The following examples are also encompassed by the present disclosure and may fully or partly be incorporated into embodiments.

1. An apparatus (10) for producing a three-dimensional work piece comprising:
    an irradiation unit (20) comprising at least one scanning unit (22a) configured to scan a radiation beam (24a) over an uppermost layer of raw material powder to predetermined sites of the uppermost layer of the raw material powder in order to solidify the raw material powder at the predetermined sites,
    wherein an axis corresponding to the radiation beam (24a) when it impinges on the uppermost layer of raw material powder at an angle of 90° is defined as a central axis (26a) for the scanning unit (22a); and
    a control unit (27) configured to
        receive work piece data indicative of at least one layer of the three-dimensional work piece to be produced, and
        assign at least a part of a contour of the layer of the three-dimensional work piece to the at least one scanning unit (22a),
    characterized in that
    the control unit (27) Is configured to generate control data for controlling the irradiation unit (22a), the control data defining a scan strategy of the radiation beam (24a) such that for more than 50% of an entire length the radiation beam (24a) moves along the contour assigned to the at least one scanning unit (22a), the radiation beam (24a) moves away from the central axis (26a).

2. An apparatus (10) according to the preamble of example 1 or according to example 1,
    wherein the irradiation unit (20) comprises a further scanning unit (22b) configured to scan a further radiation beam (24b) over the uppermost layer of raw material powder to predetermined sites of the uppermost layer of the raw material powder in order to solidify the raw material powder at the predetermined sites,
    wherein an axis corresponding to the further radiation beam (24b) when it impinges on the uppermost layer of raw material powder at an angle of 90° is defined as a further central axis (26b) for the further scanning unit (22b);
wherein the control unit (27) is configured to assign a part of the contour of the layer of the three-dimensional work piece to the scanning unit (22a), such that an angle between the radiation beam (24a) and the central axis (26a) stays below a predefined value smaller than a maximum possible deflection angle of the scanning unit (22a), and to assign a further part of the contour to the further scanning unit (22b), such that an angle between the further radiation beam (24b) and the further central axis (26b) stays below a further predefined value smaller than a maximum possible deflection angle of the further scanning unit (22b).

3. The apparatus (10) according to example 1 or 2,
wherein the control unit (27) is configured to generate control data for controlling the irradiation unit (22a), the control data defining a scan strategy of the radiation beam (24a) such that an irradiation power of the radiation beam (24a) and/or a scan speed of the radiation beam (24a) is adapted based on an angle between the radiation beam (24a) and the central axis (26a), such that the irradiation power is increased when the angle increases and/or the scan speed is decreased when the angle increases.

4. The apparatus (10) according to example 3, wherein the control unit (27) is configured to, based on the work piece data, determine a thickness of the work piece in at least one region where the radiation beam (24a) is to be irradiated, decide whether the thickness is below a predefined threshold value, and, when the thickness is below the predefined threshold value, generate the control data for the at least one region such that the irradiation power is not increased in this region.

5. The apparatus (10) according to example 1, wherein the control unit (27) is configured to generate the control data such that for more than 60%, for more than 70%, for more than 80%, or for more than 90% of the entire length the radiation beam (24a) moves along the contour assigned to the at least one scanning unit (22a), the radiation beam (24a) moves away from the central axis (26a).

6. The apparatus (10) according to example 2, wherein the predefined value and/or the further predefined value is a value in a range between 10° to 25° and, in particular, in a range between 15° and 20°.

7. The apparatus (10) according to example 2 or 6, wherein an overlap region is defined between the scanning unit (22a) and the further scanning unit (22b), wherein the overlap region can be irradiated by both the scanning unit (22a) and the further scanning unit (22b) when the angle between the respective radiation beam (24a, 24b) and the respective central axis (26a, 26b) is below the respective predefined value.

8. The apparatus (10) according to any of examples 2, 6, or 7, wherein the control unit (27) is further configured to assign a portion of the layer of the three-dimensional work piece that is not the contour to the scanning unit (22a), such that said portion is irradiated, at least in part, by the radiation beam (24a) under an angle larger than the predefined value.

9. The apparatus (10) according to example 3 or 4, wherein the control unit (27) is configured to generate the control data such that a function of the irradiation power with regard to the angle between the radiation beam (24a) and the central axis (26a) is continuously increasing and/or such that a function of the scan speed of the radiation beam (24a) with regard to the angle between the radiation beam (24a) and the central axis (26a) is continuously decreasing.

10. The apparatus (10) according to example 9, wherein the control unit (27) is configured to generate the control data such that the irradiation power is set to a constant level for an area where the angle is below a predefined threshold value and wherein the irradiation power is continuously increased for angles above the threshold value such that a higher angle leads to a higher radiation power and/or
wherein the control unit (27) is configured to generate the control data such that the scan speed is set to a constant level for an area where the angle is below a predefined threshold value and wherein the scan speed is continuously decreased for angles above the threshold value such that a higher angle leads to a lower scan speed.

11. A method of producing a three-dimensional work piece, comprising:
receiving work piece data indicative of at least one layer of a three-dimensional work piece to be produced by scanning a radiation beam (24a) over an uppermost layer of raw material powder to predetermined sites of the uppermost layer of the raw material powder in order to solidify the raw material powder at the predetermined sites, and
assigning at least a part of a contour of a layer of the three-dimensional work piece to at least one scanning unit (22a) of an irradiation unit (20) of an apparatus (10), wherein an axis corresponding to the radiation beam when it impinges on the uppermost layer of raw material powder at an angle of 90° is defined as a central axis (26a) for the scanning unit (22a),
characterized by
generating control data for controlling the irradiation unit (20), the control data defining a scan strategy of the radiation beam (24a) such that for more than 50% of an entire length the radiation beam (24a) moves along the contour assigned to the at least one scanning unit (22a), the radiation beam (24a) moves away from the central axis (26a).

12. A method according to the preamble of example 11 or according to example 11,
wherein the irradiation unit (20) of the apparatus comprises a further scanning unit (22b) configured to scan a further radiation beam (24b) over the uppermost layer of raw material powder to predetermined sites of the uppermost layer of the raw material powder in order to solidify the raw material powder at the predetermined sites,
wherein an axis corresponding to the further radiation beam (24b) when it impinges on the uppermost layer of raw material powder at an angle of 90° is defined as a further central axis (26b) for the further scanning unit (22b),
the method further comprising:
assigning a part of the contour of the layer of the three-dimensional work piece to the scanning unit (22a), such that an angle between the radiation beam (24a) and the central axis stays below a predefined value smaller than a maximum possible deflection angle of the scanning unit (22a); and assigning a further part of the contour to the further scanning unit (22b), such that an angle between the further radiation beam (24b) and the further central axis (26b) stays below a further predefined value smaller than a maximum possible deflection angle of the further scanning unit (22b).

13. The method according to example 11 or 12, comprising:
generating control data for controlling the irradiation unit (20), the control data defining a scan strategy of the radiation beam (24a) such that an irradiation power of the radiation beam (24a) and/or a scan speed of the radiation beam (24a) is adapted based on an angle between the radiation beam (24a) and the central axis (26a), such that the irradiation power is increased when the angle increases and/or the scan speed is decreased when the angle increases.

14. A computer program product stored on a computer-readable storage medium, comprising computer-readable instructions for causing a computer to carry out the method according to any of examples 11 to 13.

The invention claimed is:

1. An apparatus for producing a three-dimensional work piece comprising:
an irradiation unit comprising at least one scanning unit configured to scan a radiation beam over an uppermost layer of raw material powder to predetermined sites of the uppermost layer of the raw material powder in order to solidify the raw material powder at the predetermined sites,
wherein an axis corresponding to the radiation beam when it impinges on the uppermost layer of the raw material powder at an angle of 90° is defined as a central axis for the at least one scanning unit; and
a control unit configured to
receive work piece data indicative of at least one layer of the three-dimensional work piece to be produced, and
assign at least a part of a contour of the at least one layer of the three-dimensional work piece to the at least one scanning unit,
characterized in that
the control unit is configured to generate control data for controlling the irradiation unit, the control data defining a scan strategy of the radiation beam such that for more than 70% of a predefined length, the radiation beam moves away from the central axis,
the predefined length being defined as a length the radiation beam moves along the contour assigned to the at least one scanning unit, excluding sections concentric with regard to the central axis,
wherein the control unit is configured to generate the control data for controlling the irradiation unit, the control data defining the scan strategy of the radiation beam such that an irradiation power of the radiation beam and/or a scan speed of the radiation beam is adapted based on an angle between the radiation beam and the central axis, such that the irradiation power is increased when the angle increases and/or the scan speed is decreased when the angle increases; and
wherein the control unit is configured to, based on the work piece data, determine a thickness of the work piece in at least one region where the radiation beam is to be irradiated, decide whether the thickness is below a predefined threshold value, and, when the thickness is below the predefined threshold value, generate the control data for the at least one region such that the irradiation power is not increased in this region.

2. The apparatus according to claim 1, wherein the predefined length is defined as an entire length the radiation beam moves along the contour assigned to the at least one scanning unit.

3. The apparatus according to claim 1,
wherein the irradiation unit comprises a further scanning unit configured to scan a further radiation beam over the uppermost layer of the raw material powder to predetermined sites of the uppermost layer of the raw material powder in order to solidify the raw material powder at the predetermined sites,
wherein an axis corresponding to the further radiation beam when it impinges on the uppermost layer of the raw material powder at an angle of 90° is defined as a further central axis for the further scanning unit;
wherein the control unit is configured to assign a section of the contour of the at least one layer of the three-dimensional work piece to the at least one scanning unit, such that an angle between the radiation beam and the central axis stays below a predefined value smaller than a maximum possible deflection angle of the at least one scanning unit, and to assign a further section of the contour to the further scanning unit, such that an angle between the further radiation beam and the further central axis stays below a further predefined value smaller than a maximum possible deflection angle of the further scanning unit.

4. The apparatus according to claim 1, wherein the control unit is configured to generate the control data such that for more than 80% or for more than 90% of the predefined length, the radiation beam moves away from the central axis.

5. The apparatus according to claim 3, wherein the predefined value and/or the further predefined value is a value in a range between 10° to 25°.

6. The apparatus according to claim 3, wherein an overlap region is defined between the at least one scanning unit and the further scanning unit, wherein the overlap region can be irradiated by both the at least one scanning unit and the further scanning unit when the angles between the respective radiation beam and the respective central axis are below the respective predefined value.

7. The apparatus according to claim 3, wherein the control unit is further configured to assign a portion of the at least one layer of the three-dimensional work piece that is not the contour to the at least one scanning unit, such that said portion is irradiated, at least in part, by the radiation beam under an angle larger than the predefined value.

8. The apparatus according to claim 3, wherein the predefined value and/or the further predefined value is a value in a range between 15° and 20°.

* * * * *